United States Patent [19]

Erickson

[11] 4,082,030
[45] Apr. 4, 1978

[54] PLASTIC SCREW GROMMET

[75] Inventor: Lloyd A. Erickson, Park Ridge, Ill.

[73] Assignee: Illinois Tool Works, Inc., Chicago, Ill.

[21] Appl. No.: 781,075

[22] Filed: Mar. 25, 1977

[51] Int. Cl.² ............................................. F16B 13/04
[52] U.S. Cl. ........................................................ 85/80
[58] Field of Search .................. 85/80, 81, 83, 82, 84, 85/72, 5 R; 151/41.75; 24/73 P, 73 PF, 73 HS

[56] References Cited

U.S. PATENT DOCUMENTS

| | | | |
|---|---|---|---|
| 2,573,498 | 10/1951 | Scott | 85/82 |
| 3,469,493 | 9/1969 | Fisher | 85/5 R X |
| 3,476,008 | 11/1969 | Pearson et al. | 85/5 R |
| 3,593,612 | 7/1971 | Schulze | 85/80 |
| 3,703,120 | 11/1972 | Van Buren | 85/83 |
| 3,756,116 | 9/1973 | Schuplin | 85/80 |

FOREIGN PATENT DOCUMENTS 1,318,704   1/1963   France ........................ 85/82

*Primary Examiner*—Ramon S. Britts
*Attorney, Agent, or Firm*—Robert W. Beart; Jack R. Halvorsen

[57] ABSTRACT

A one-piece plastic screw grommet for use in a polygonally apertured panel. The shank of the grommet is complimentary to the aperture with which it is used and includes a plurality of posts positioned in the corners of the aperture with the posts carrying web-like spring members that support and co-act with legs positioned medially between adjacent posts. Each leg includes a transversely concave inner surface forming a segment of the bore with the concave surface falling substantially on the pitch diameter of the screw with which it is associated. The posts, legs, and spring members are supported at opposite ends by the head and a free end element, with the end element closing the bore and the head sealing against the panel.

8 Claims, 7 Drawing Figures

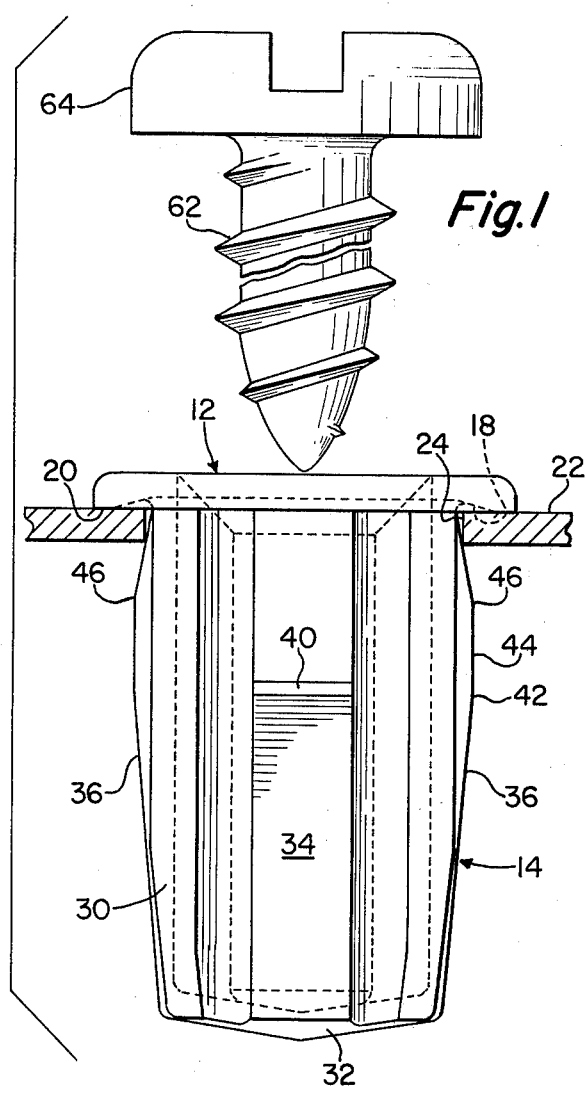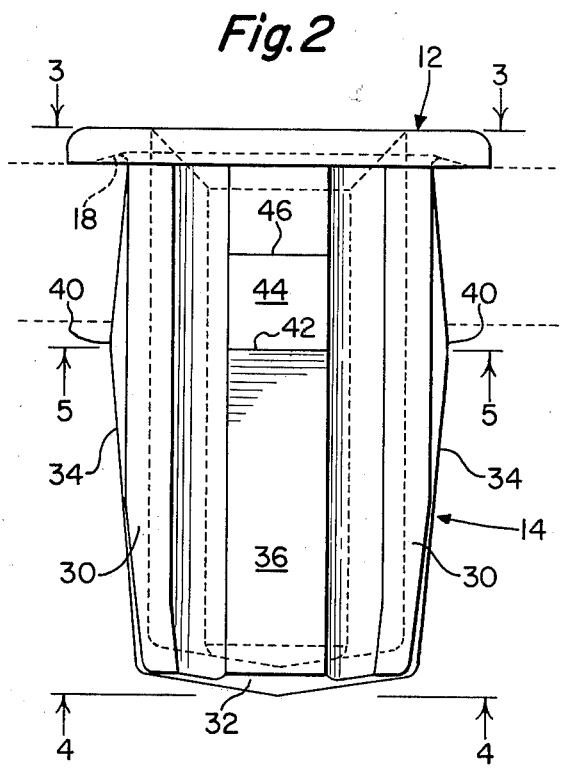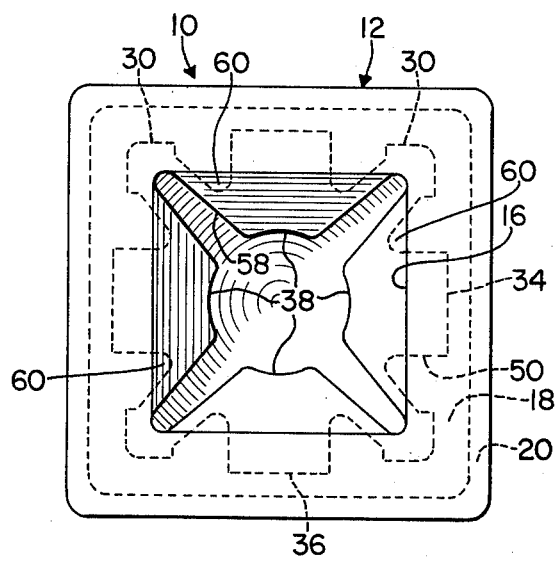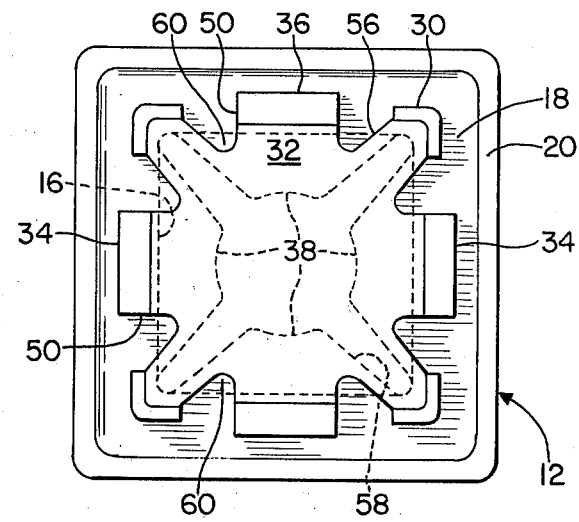

PLASTIC SCREW GROMMET

BACKGROUND OF THE INVENTION

1. Field of the Invention

This invention relates to screw grommets or nut devices of the type frequently referred to as insulated screw grommets or snap-in nuts. Devices having the characteristics embodied herein are primarily, but not exclusively, found in United States Art Class 85, Subclasses 80, 82, 83 and 84, under the general classification heading "Expanding Anchor" and Art Class 151 in the subclasses dealing with nuts having deformable and/or resilient retainers.

2. Description of the Prior Art

The use of screw grommets or snap-in nuts in the liners of foam filled refrigerators presently requires special sealing to prevent foam leakage through the hole. In the manufacturing techniques utilized today for making refrigerators, approximately 40% of the refrigerators made are insulated by a foamed in-situ material with the remainder being insulated with a fiberglass material. It is anticipated that within the next few years all refrigerators will be insulated by a foamed material. The insulated grommets that are available on today's market will generally seal the aperture from the foam material to a certain degree but not completely. Usually a small amount of foam will leak out around the grommet with the foam being brushed off by an operator prior to insertion of a screw. This is acceptable on porcelain refrigerator liners because the foam does not attack the porcelain. However, more and more of the manufacturers are going in the direction of pre-painted or powder-painted cabinets in which the paint is subject to attack by the foam and, therefore, becomes an appearance problem. Additionally, it is necessary to seal the apertures in the liner from moisture which could move from the interior of the liner to the insulation compartment and would have a deleterious effect thereupon.

Previous efforts by other inventors are represented by the U.S. Pat. Nos. to Schuplin 3,342,098; Van Buren 3,703,120; and my own U.S. Pat. No. 3,830,134. Each of these devices is an insulated grommet or scew anchor which uses as its basis for operation the original teachings of the patent to Rapata U.S. Pat. No. 2,788,047, wherein a pair of leg members are disposed axially from the underside of the head to engage the walls of the aperture upon insertion of a screw in a central bore. In the case of the Schuplin patent and the Van Buren patent, they both utilize the teachings of Rapata with Schuplin adding a sack-like member to encircle the bore with the sack extending laterally outwardly beyond the margins of the legs, while the Van Buren device utilizes inwardly directed sack-like means for insulation purposes. My own prior patent, while completely serviceable for certain applications, utilizes a pair of spaced legs with an oval tubular member between the legs which is expanded to a cylindrical form upon insertion of a screw member therein. Related art can be found in the U.S. Pat. to Schulze No. 3,593,612, assigned to the common assignee of the present invention, as well as the patent to Rapata U.S. Pat. No. 3,803,973; a second patent to Schuplin U.S. Pat. No. 3,756,116; and a much older blind bore fastener issued to Scott U.S. Pat. No. 2,573,498. Each of these devices have shortcomings in that there is an opportunity in Schuplin '098, Van Buren '120 as well as my own '134 patent wherein the screw, if it is provided with a sharp point, can be cocked or angularly introduced into the bore and inadvertently puncture the sealing sack associated with one of these fasteners. With the fastener being a "blind" application, it is impossible to determine the presence of such interruptions in the sealing member associated with the fastener until after the damage is done. The patent to Schulze '612 represents a heavy rigid form of fastener which has a high insertion force into the aperture and lacks guarantees that the fastener is suitably seated with its head against the panel. Additionally, each of the devices mentioned generally have the disadvantage that in the manufacture there is a necessity for a parting line of the mold to be present on the undersurface of the head. The presence of this parting line, no matter how small, still does not permit total sealing of the head against the work panel around the aperture.

SUMMARY OF THE INVENTION

The present invention relates to an improved sealing screw grommet having a unique stud configuration and a head carrying a smooth sealing flange surface that is totally free of parting line marks. The stud portion includes a plurality of substantially rigid post-like members present in each corner of the grommet that are acceptable in the corners of a polygonal aperture in the supporting work panel. A plurality of legs are disposed medially between the corner post and supported by thin web-like spring members between the side surfaces of the legs and the corner posts with the spring-like members assisting the legs and sealing the shank from the surrounding environment.

A further improvement of the present invention relates to the ability to fabricate the device in a submarine gated injection molded two-plate mold to provide a smooth surface under the head without any parting lines of the mold being present on such surface.

A further object of the present invention is to provide a fastening device which can be economically molded in one piece from thermoplastic materials and which will effectively seal a screw threaded fastening means from the environment existing on the backside of the panel.

It is submitted that consideration of the detailed description of a preferred embodiment of the present invention will permit those skilled in the art to recognize that the present invention eliminates the deficiencies described hereinabove as well as to recognize the improvements in the art spelled out therein.

BRIEF DESCRIPTION OF THE DRAWINGS

FIG. 1 is an elevational view of the preferred embodiment of the present invention shown in inserted position in an apertured panel with the screw threaded member to be utilize therewith positioned prior to installation therein;

FIG. 2 is a side elevational view of the device shown in FIG. 1 as it is rotated 90°, with a thicker panel being shown in phantom;

FIG. 3 is a plan view from the head end of the fastener taken along line 3—3 of FIG. 2;

FIG. 4 is a plan view of the bottom or entering end of the fastener as viewed along line 4—4 of FIG. 2;

DESCRIPTION OF THE PREFERRED EMBODIMENT

Figure 5:
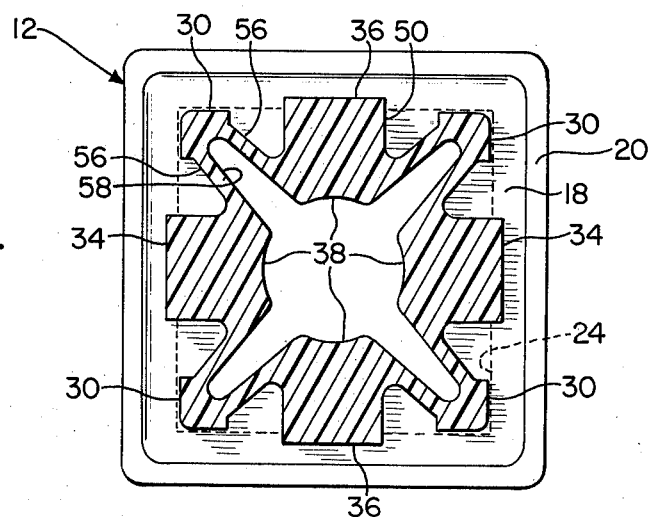
FIG. 5 is a transverse cross-sectional view taken along line 5—5 of FIG. 2.

A fastener or insulated screw grommet 10 of the type contemplated by the present invention includes a head 12 and a shank 14. The head 12 includes a central opening or aperture 16 and a tapered under periphery 18 forming a sealing edge or surface 20 devoid of mold parting line marks and adapted to contact one surface of the apertured panel 22.

Panel 22 is provided with a polygonally shaped aperture 24 for accepting the complimentary shank 14. In the preferred embodiment, the aperture 24 would be generally rectangular or square in configuration with the polygonally shaped shank also being square, although it will be recognized, from the following description, that the aperture and shank could be of any number of desired sides although not shown in the present drawing. The shank 14 includes a plurality of substantially rigid corner posts 30 that extend integrally from the underside of head 12 and are interconnected at the opposite end by end member 32. In the present embodiment there are four corner posts with two pairs of opposed leg members designated 34 and 36 disposed medially between adjacent corner posts 30 and extending between and connected to the head 12 and end member 32.

Each of the legs is provided with an axially extending transversely concave inner surface 38 all of which lie on the pitch diameter of the screw to be associated therewith and form the bore of the shank section which is substantially co-axial with the head opening 16. Each of the legs 34 taper outwardly from the entering end element 32 to an intermediate point 40 and thence inwardly the balance of the way to the head. The intermediate point 40 serves to form a shoulder means spaced on the two opposed legs 34 a predetermined distance from the head 12. The legs 36 taper outwardly from the entering end a predetermined distance to point 42 and then have a surface 44 substantially parallel to the axis of the fastener to a second point 46 closer to the head than the point 40, as seen on legs 34, at which point 46 the leg 34 tapers inwardly toward the head. In this fashion, the opposed legs 34 provide shoulder means 40 at a predetermined distance from the head while the point 46 provides a second shoulder means at a closer distance to the head on the opposed legs 36, to thereby accept a variety of panel thicknesses.

Each of the legs 34 and 36 are provided with side surfaces 50 which interconnect the inner concave surface 38 and the outer shouldered surface of each leg. Interconnecting each leg with its adjacent corner post 30 is a thin web-like spring member 56 which is joined to a corner post 30 and the side surface 50 of the leg adjacent the concave inner surface 38. The spring-like members 56 extend axially between the head 12 and the end element 32 and serve to support each of the legs 34 and 36 as well as to peripherally seal the bore defined by the surfaces 38 from the surrounding environment. The web-like elements 56 connected to each post 30 are spaced from one another to provide a radially disposed axially extending slot 58.

At the head end, as seen in FIG. 3, a thin web-like element 60 interconnects the upper chamfered surface of the legs 34 and 36 as well as the upper chamfered edge of the web-like members 56 to the edge of the head opening 16. This provides an angularly disposed or chamfered entry for the screw to lead it into the bore defined by the concave surfaces 38 as well as to effectively seal the opening 16 in the head from the surrounding environment.

Figure 6:
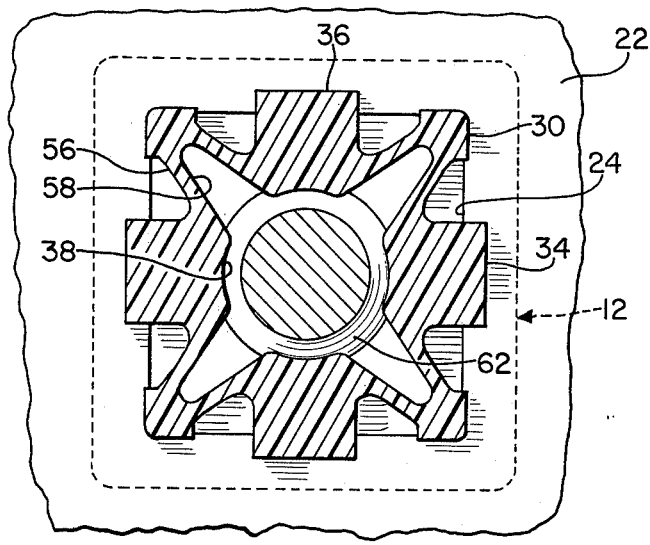
FIG. 6 is a similar transverse cross-sectional view showing the position of the various elements of the preferred embodiment with a screw in inserted position.
Figure 7:
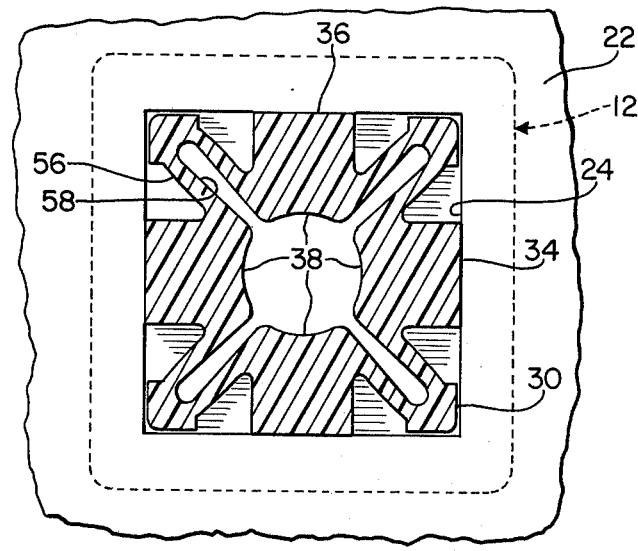
FIG. 7 is a transverse sectional view similar to FIG. 5 showing the preferred embodiment as it is being inserted into the complimentary work panel aperture.

When the present device is introduced into an aperture having a complimentary configuration to that defined in transverse section by the corner posts 30, the posts are readily accepted in aperture 24 by introduction of the tapered entering end terminating in end element 32. The slots 58 are closed up, as seen in FIG. 7, as the intermediate shoulders 40 and 42 engage the edges of the aperture and the legs 34 and 36 are moved radially inwardly. As the shoulders 40 and 46 through the aperture 24 are exposed to the backsurface of the panel 22, the spring elements 56 will urge the legs outwardly to underlie the panel, as seen in phantom in FIG. 5. Similarly, when a screw 60 is axially introduced through the opening 16 into the bore 38 and rotated by suitable means such as the kerf 62, the screw will tend to cut or form its own threads on the concave surfaces 38 as well as to laterally expand the legs 34 and 36 to underlie the panel 22 on the side opposite that contacted by the sealing surface 20. FIG. 6 is an example showing the expansion of the legs 34 and 36 with the resultant opening of slots 58 when a screw 62 is inserted into the fastener.

The present fastening device or screw grommet 10 can be injection molded in a submarine gated two-plate mold of suitable thermoplastic materials, such as nylon. It can be economically fabricated with short time cycles due to its relatively thin sections and overcomes the deficiencies of the prior art by providing closely associated opposed concave surfaces 38 with thin slots 58 that generally prevent cocking or misdirection of the screw 60 during its introduction thereby preventing any fracture or rupture of the web-like elements 56 while insuring the integrity of the sealing aspects of the fastener. It is felt that other embodiments having a polygonal configuration, such as triangular, hex or octagonal, which are mentioned as examples and not by way of limitation, will function equally well and be apparent to those skilled in the art.

I claim:

1. A one-piece plastic screw grommet for acceptance of a screw and adapted for use in a polygonal apertured panel, said grommet including an enlarged apertured head adapted to overlie one side of said panel and cover said aperture and a depending shank complimentary in cross section to said panel aperture, said shank including a plurality of substantially rigid posts extending axially from said head in each corner of said shank and so positioned as to be located in each corner of the polygonal aperture, an end element interconnecting the free ends of said posts and spaced from said head to form a closed free entering end on said shank, a plurality of polygonal legs extending axially from and each connected at opposite ends to said head and said end element, each leg having an axially extending transversely concave inner surface spaced from the axis of said shank a predetermined distance and each said leg positioned medially between an adjacent pair of posts, said concave inner surfaces of said legs forming the bore of said shank and normally lying substantially on the pitch diameter of said screw and coaxial with said head aperture, each leg having panel engaging means on its outer surface and a pair of side surfaces interconnecting said outer surface and the concave inner surface, a spring-like thin web-like member extending integrally from each side surface of said legs adjacent to its inner concave surface and connected at the opposite end to each adjacent post, said thin web-like members and said legs extending continuously from said head to said end element which covers the entire free end of said shank, each pair of adjacent spring-like elements being spaced from each other as they extend from adjacent legs to a common one of said posts to thereby form a plurality of radially disposed slots extending between said bore and said corner posts, said legs, said spring-like elements and said posts forming a closed periphery for said shank, each side of said shank further including axially extending grooves defined by the side surfaces of said legs and their adjacent connected web-like members extending to said corner posts, said posts and the exterior surface of the legs opposite the bore surface defining the external polygonal configuration of said grommet which is complementary to said polygonal aperture, whereby said legs are adapted to flex radially inwardly against said spring-like elements during insertion into said polygonal aperture and flex outwardly upon insertion of said screw in said bore.

2. A grommet of the type claimed in claim 1 wherein said grommet shank is substantially square, there are four posts, four legs, and eight thin web-like elements forming the spring-like members.

3. A grommet of the type claimed in claim 2 wherein one opposed pair of legs has their panel engaging means a predetermined distance from said head while the second pair of opposed legs has their panel engaging means at a second predetermined distance from said head to thereby except a range of panel thicknesses between said two predetermined distances.

4. A grommet of the type claimed in claim 3 wherein one pair of said legs taper outwardly from adjacent the free end to a first intermediate point and then tapers inwardly to said head to form intermediate shoulder means.

5. A grommet of the type claimed in claim 4 wherein said other pair of said legs taper outwardly from adjacent the free end substantially to said first intermediate point and then continue substantially parallel to the axis of said shank to a second intermediate point and then tapers inwardly to said head to form secondary shoulder means having a different axial spacing from the head than said first shoulder means.

6. A grommet of the type claimed in claim 3 wherein said legs and said posts taper outwardly from said closed end to intermediate points along said shank.

7. A grommet of the type claimed in claim 1 wherein said legs and said web-like members adjacent said head aperture taper inwardly toward said bore and four angularly disposed plate-like elements joined to said legs, said members and said head taper inwardly from said head to said bore to provide a closed lead-in surface for said screw.

8. A grommet of the type claimed in claim 1 wherein said head includes a peripherally continuous smooth sealing edge facing in the direction of said shank.

* * * * *